United States Patent [19]

Tanca et al.

[11] Patent Number: 5,284,550
[45] Date of Patent: Feb. 8, 1994

[54] BLACK LIQUIER GASIFICATION PROCESS OPERATING AT LOW PRESSURES USING A CIRCULATING FLUIDIZED BED

[75] Inventors: Michael C. Tanca, Tariffville, Conn.; Erik G. A. Dahlquist; Sune Flink, both of Vasteras, Sweden

[73] Assignee: Combustion Engineering, Inc., Windsor, Conn.

[21] Appl. No.: 900,351

[22] Filed: Jun. 18, 1992

[51] Int. Cl.$^5$ .......................................... D21C 11/12
[52] U.S. Cl. ................... 162/31; 162/30.11; 162/30.1; 48/197 R; 48/203
[58] Field of Search ................. 162/29, 30.1, 31, 36, 162/47; 48/197 R, 203, 209; 423/DIG. 3, 206 R, 207; 122/4 D

[56] References Cited

U.S. PATENT DOCUMENTS

| | | | |
|---|---|---|---|
| 3,867,251 | 2/1975 | Holme | 162/30.1 |
| 4,526,760 | 7/1985 | Empie | 162/30.1 |
| 4,536,253 | 8/1985 | Bertelsen | 162/30.11 |
| 4,823,739 | 4/1989 | Marcellin | 165/104.18 |
| 4,872,950 | 10/1989 | Andersson et al. | 162/31 |
| 4,930,429 | 6/1990 | Ryham | 48/209 |
| 4,969,930 | 11/1990 | Arpalahti | 48/203 |

Primary Examiner—W. Gary Jones
Assistant Examiner—Dean T. Nguyen
Attorney, Agent, or Firm—Arthur E. Fournier, Jr.

[57] ABSTRACT

A black liquor gasification system intended for use as a replacement for a Tomlinson cycle, Chemical Recovery Unit, and which operates at a temperature below the ash melting temperature thereby removing the potential for smelt-water reactions and explosions. The subject black liquor gasification system is based on the use of a circulating fluidized bed operating at atmospheric pressure that produces dry, recoverable salts as well as low calorific gases to be used within the papermaking process.

8 Claims, 3 Drawing Sheets

PROCESS FLOW DIAGRAM

PROCESS FLOW DIAGRAM

RECOVERY UNIT — 26

108 → OVERALL REACTION (*):
 — BLACK LIQUOR + AIR — $Na_2CO_3$ + $CO + CO_2 + H_2 + H_2O + H_2S + N_2$

110 → SULFATE REDUCTION:
 — $Na_2SO_4 + 4CO$ — $Na_2S + 4CO_2$
 — $Na_2S + H_2O + CO_2$ — $Na_2CO_3 + H_2S$

KILN

98 • COMMON TO TOMLINSON AND BLG

CAUSTICIZER

112 → $Na_2CO_3 + CaO + H_2O$ — $2NaOH + CaCO_3$

SCRUBBER — 22

114 → $2NaOH + H_2S$ — $Na_2S + 2H_2O$
 → $NaOH + Na_2S$ — WHITE LIQUOR

OR

SCRUBBER — 22

116 → $Na_2CO_3 + H_2S + H_2O$ — $NaHCO_3 + NaHS$
118 → $NaHCO_3 + NaHS + CaO$ — $Na_2S + CaCO_3 + H_2O$

MAJOR CHEMICAL REACTIONS FOR KRAFT LIQUOR
PREPARATION WITH BLACK LIQUOR GASIFICATION
SYSTEM

Fig. 3

BLACK LIQUIER GASIFICATION PROCESS OPERATING AT LOW PRESSURES USING A CIRCULATING FLUIDIZED BED

BACKGROUND OF THE INVENTION

This invention relates to systems that are used by paper mills, and, more specifically, to a black liquor gasification system through the operation of which by using a fluidized bed reactor, which makes a dry product, chemicals from a Kraft process can be recovered without forming a smelt thereby removing the potential for smelt/water explosions.

The type of systems to which reference is made herein historically have been comprised of what is commonly known in the industry as a Chemical Recovery Unit or CRU. Chemical Recovery Units are boilers that are used by paper mills for two reasons. The primary reason, as the name Chemical Recovery Unit suggests, is to recover the chemicals that are used in the process of breaking down the wood into the pulp which is then made into paper. The wood in the process of being broken down is treated in a vessel called a digester by heating with steam and mixing with chemicals. The used chemical residue which is produced as a result of processing the wood in the digester is commonly referred to as "Weak Black Liquor". This liquid is mainly water, i.e., approximately 84%, at this stage. Subsequent processing reduces the water content until the water content is approximately 32% of the volume. The liquid in this state is commonly referred to as "Strong Black Liquor". "Strong Black Liquor" constitutes the fuel which is burned in the Chemical Recovery Unit, i.e., boiler, to make steam. As the "Strong Black Liquor" is burned in the Chemical Recovery Unit the chemicals which do not burn form a molten pool in the bottom of the Chemical Recovery Unit and this pool, referred to in the industry as the "smelt", is continuously drawn off and processed to return the chemicals to the digester whereupon the cycle is once again repeated.

Chemical Recovery Units insofar as they are boilers operate in essentially the same manner as any other boiler. As do all other boilers, Chemical Recovery Units burn a fuel to create heat. This heat in turn is used to convert water into steam which is used either as steam or converted via the use of a turbine into electricity. The one main difference between a Chemical Recovery Unit and all other types of boilers is that the Chemical Recovery Unit unlike all other types of boilers has at all times in the bottom thereof a smelt bed.

The potential result of a waterwall leak in any other type of boiler other than a Chemical Recovery Unit is the loss of pressure and the destruction of a few of the surrounding tubes. On the other hand, in a Chemical Recovery Unit if the water from the waterwall should contact the smelt bed the potential exists for a violent explosion. While the typical explosions experienced in a boiler which uses a conventional fuel such as coal, oil or gas in air produces high pressures and travels at the speed of sound, smelt-water explosions produce much higher pressures, perhaps by a factor of 10 or more, and travel at supersonic speeds. A smelt-water explosion is the result of water changing suddenly to steam. The rapid change in state is the result of an extreme heat transfer rate, and the seriousness of a smelt-water explosion is not directly related to the amount of smelt or water involved. A smelt-water explosion is one of the major personnel safety issues in the paper mill. In addition this also leads to higher than desired insurance premiums for the plant. As such, the paper companies are very desirous of having new and improved systems developed that would enable them to produce paper in a manner which is safer and more cost effective.

One prior art form of Chemical Recovery Unit comprises the subject matter of U.S. Pat. No. 3,047,362 entitled "Treatment of Waste Liquors", which issued on Jul. 31, 1962 and which is assigned to the same assignee as the present application. In accordance with the teachings of the aforereferenced U.S. Pat. No. 3,047,362, the nature of the construction and the mode of operation of the Chemical Recovery Unit that is described and illustrated therein is as follows. The Chemical Recovery Unit has a furnace that extends upwardly and has as its upper end a boiler. Concentrated liquor is introduced into the furnace through spray nozzles with the liquor being dried almost instantaneously as it passes down toward the bottom of the furnace. The burnables of the liquor are being burned during this descent. The chemicals in the liquor, on the other hand, are smelted in the furnace and collect at the bottom thereof with these chemicals being continuously withdrawn through a suitable spout. The combustion gases generated by burning the burnables of the liquor in the furnace pass upwardly over the tubes of the boiler and leave the boiler at the outlet thereof. These gases which have a relatively high temperature, as for example, 700° to 750° F., pass through an air heater. In passing through this air heater a large portion of the remaining heat in the combustion gases is removed with these gases afterward leaving the air heater, passing through an induced draft fan and to the stack for discharge to the atmosphere and with the temperature of the gases having been reduced by the air heater so that they may be so discharged without excessive waste of heat.

With further reference to the teachings to be found set forth in U.S. Pat. No. 3,047,362, the liquor as it comes from the pulp digester has a concentration of about 15% solids. This liquor is concentrated to about 55% solids by means of steam that is supplied from the boiler of the Chemical Recovery Unit. Thereafter, the liquor is concentrated to its desired concentration, as for example, from 55% solids to a concentration of between 65 and 75% solids by being subjected to air from the air heater, which has been referred to herein previously. After having been concentrated to its desired concentration of between 65 and 75%, the liquor is then introduced into the furnace of the Chemical Recovery Unit through the spray nozzles to which reference has been had hereinbefore.

Efforts have been made previously in an attempt to minimize the difficulties occasioned by the existence of smelt in a Chemical Recovery Unit. Some of these efforts are acknowledged in U.S. Pat. No. 4,872,950 entitled "Process for Recovering Energy and Chemicals from Spent Liquor in Pulp Preparation" that issued on Oct. 10, 1989. For example, in accordance with one such attempt which is acknowledged therein, i.e., in the Champion process (TAPPI Journal, Nov. 1985, pages 106–110), concentrated black liquor is injected at the upper part of a vertical furnace and is thermally decomposed (gasified) under access of air forming a melt and a combustible gas. The melt is collected at the bottom of the furnace and discharged to the recovery of chemicals, and the gas is burned in a gas turbine or a steam boiler.

Another such attempt, which is also acknowledged in U.S. Pat. No. 4,872,950, involves the SCA-Billerud process (E. Hornstedt and J. Gommi, Paper Trade Journal 158 (1974):16, pages 32-34) wherein the liquor is subjected to pyrolysis in a reactor under such temperature conditions that a dust substantially consisting of sodium carbonate and carbon is obtained as well as a combustible gas containing sulfur compounds. The solid and gaseous materials are separated in a wet scrubber at the same time as the sulfur-containing gases are being absorbed by the aforementioned sodium carbonate solution that has been formed. The remaining gases are then burned in a boiler to recover energy therefrom while the carbon is removed by means of filtration from the resulting liquid phase that is obtained from the scrubber. Thereafter, this liquid phase is subjected to causticizing in the usual manner in order to obtain white liquor.

A third such attempt, which is also acknowledged in U.S. Pat. No. 4,872,950, is that process for recovery of energy and chemicals in a sulfate process which can be found described in the international patent application PCT/SE86/00249. In accordance with this process, the concentrated black liquor is gasified in a pressurized reactor by means of so-called "flash pyrolysis" at 700°-1300° C. whereby an energy-rich gas and a melt of substantially sodium carbonate and sodium sulfide are formed. This melt is directly dissolved in water and the solution resulting therefrom may be used for washing out hydrogen sulfide from the gaseous fraction. Thereafter, the green liquor thus formed is recycled for use in the preparation of the digesting liquor. The gas in turn is used as the fuel which is burned for purposes of generating steam.

Notwithstanding the efforts that have been made heretofore, as exemplified by those efforts to which specific reference has been made hereinbefore, the problems associated with the formation of the melt, i.e., the smelt, in the Chemical Recovery Unit were not eliminated. Moreover, to the extent that the formation of the melt were minimized, as in the case of the SCA-Billerud process to which reference has been had hereinbefore, another problem was created. Namely, the steps taken, such as in the SCA-Billerud process, to minimize the formation of the melt had the concomitant undesirable effect of resulting in an increase in the formation of carbon. Accordingly, it was believed that there still existed a need for a new and improved process, the use of which would neither result in the formation of a melt, i.e., a smelt, nor at the same time would there be a resulting increase in the formation of carbon. The process, which comprises the inventive subject matter of U.S. Pat. No. 4,872,950 entitled "Process for Recovering Energy and Chemicals from Spent Liquor in Pulp Preparation", and which issued on Oct. 10, 1989, is indicated to be such a process.

In accordance with this process, as described and illustrated in the aforementioned U.S. Pat. No. 4,872,950, a concentrated spent liquor from the preparation of pulp is thermally decomposed forming gaseous and solid products. This thermal decomposition is carried out with a supply of oxygen in an amount below the stoichiometrically required amount, at a pressure above atmospheric and at such a temperature that no melt is formed. To this end, it has been found, according to the teachings of the aforementioned U.S. Pat. No. 4,872,950, that by gasifying the black liquor at an elevated pressure of 10-50 bar and preferably at 15-25 bar, it is possible to operate at higher temperatures and still obtain the main portion of the included sulfur in the form of gaseous hydrogen sulfide. At the same time, the formation of carbon from the included organic materials is suppressed due to the higher working temperature. Obviously, however, the working temperature must not be raised so high as to cause a melt to form.

To the extent that it is possible with the process, which comprises the inventive subject matter of the aforementioned U.S. Pat. No. 4,872,950, to avoid the formation of a melt while at the same time the formation of carbon is being suppressed, this process is nevertheless disadvantageously characterized in other respects. For example, the process of U.S. Pat. No. 4,872,950 requires for its implementation that it be carried out at elevated pressures. However, it is well-known that the need for a process to be operated at elevated pressures introduces additional complexity to the process. In addition to being inherently more complex, those components employed in such a process that are required to operate at elevated pressures are normally more costly to provide than are components which operate essentially at atmospheric pressure or at slightly higher pressure levels, e.g., on the order of 1 to 2 bar. Moreover, there generally is a need to take additional safety concerns into account when pressurized components are involved than when unpressurized components are involved.

Although processes of the type acknowledged in the aforementioned U.S. Pat. No. 4,872,950 as well as the process which comprises the inventive subject matter of U.S. Pat. No. 4,872,950 itself have been demonstrated to be operative for the purpose for which they have been designed, there has nevertheless been evidenced in the prior art a need for such processes to be further improved if the paper companies are to be able to produce paper in a manner which is safer and more cost effective than that presently being utilized by the paper companies. Namely, a need is being evidenced in the prior art for a new and improved process which would be capable of serving as a replacement for a Chemical Recovery Unit. Moreover, there has been evidenced in the prior art a need for such a new and improved process that would be characterized in a number of respects. To this end, one such characteristic which such a new and improved process would desirably possess is that in the operation thereof no smelt would be formed. Another characteristic which such a new and improved process would desirably possess is that in the operation thereof there would be no increased formation of carbon. A third characteristic which such a new and improved process would desirably possess is the capability of producing dry recoverable salts. A fourth characteristic which such a new and improved process would desirably possess is the capability of producing low calorific gases to be used within the paper-making process. A fifth characteristic which such a new and improved process would desirably possess is that it be inherently safer than the processes which are presently being utilized for similar purposes. A sixth characteristic which such a new and improved process would desirably possess is that it be more cost effective than the processes which are presently being utilized for similar purposes. A seventh characteristic which such a new and improved process would desirably possess is that it be at least no more difficult to operate than the processes which are presently being utilized for similar purposes.

To thus summarize, a need has been evidenced in the prior art for such a new and improved process that would be particularly suited for use by paper companies as a replacement for Chemical Recovery Units. Moreover, the usage of such a new and improved process would be accomplished in such a manner as to preclude smeltwater reactions and explosions by virtue of the fact that the temperature which is employed in the process is kept below the ash melting temperature. Furthermore, the usage of such a new and improved process would be effected such that there are produced therewith for utilization within the paper-making process both dry, recoverable salts and low calorific gases.

It is, therefore, an object of the present invention to provide a new and improved system for use as a replacement for a Tomlinson cycle, Chemical Recovery Unit.

It is a further object of the present invention to provide such a new and improved system for use as a replacement for a Tomlinson cycle, Chemical Recovery Unit which is characterized in that in the operation thereof no smelt is formed.

It is another object of the present invention to provide such a new and improved system for use as a replacement for a Tomlinson cycle, Chemical Recovery Unit which is characterized in that in the operation thereof there is no increased formation of carbon.

Another object of the present invention is to provide such a new and improved system for use as a replacement for a Tomlinson cycle, Chemical Recovery Unit which is characterized in that dry recoverable salts that are capable of being utilized in the paper-making process are produced therewith.

Still another object of the present invention is to provide such a new and improved system for use as a replacement for a Tomlinson cycle, Chemical Recovery Unit which is characterized in that low calorific gases that are capable of being utilized in the paper-making process are produced therewith.

A further object of the present invention is to provide such a new and improved system for use as a replacement for a Tomlinson cycle, Chemical Recovery Unit which is characterized in that it is inherently safer than the systems which are presently being utilized for similar purposes.

Yet another object of the present invention is to provide such a new and improved system for use as a replacement for a Tomlinson cycle, Chemical Recovery Unit which is characterized in that it is more cost effective than the systems which are presently being utilized for similar purposes.

Yet a further object of the present invention is to provide such a new and improved system for use as a replacement for a Tomlinson cycle, Chemical Recovery Unit which is characterized in that it is at least no more difficult to operate than the systems which are presently being utilized for similar purposes.

SUMMARY OF THE INVENTION

In accordance with the present invention there is provided a black liquor gasification system and process therefor that is particularly suited for use as a replacement for a Tomlinson cycle, Chemical Recovery Unit. The subject black liquor gasification system and process therefor involves the utilization of a circulating fluidized bed which operates at substantially atmospheric pressure. Air and black liquor are fed to the circulating fluidized bed wherein various chemical reactions take place. Solids, which are primarily sodium carbonate and sodium sulfide, leave the lower portion of the circulating fluidized bed to feed other portions of the Kraft cycle. A raw product gas leaves the upper portion of the circulating fluidized bed and is fed into a mechanical separator device, such as one or more cyclones. The mechanical separator device operates to remove coarse solids from the raw product gas for recycle back to the circulating fluidized bed. The solids, which can be removed in the mechanical separator device, can be passed through an ash cooler to remove excess heat therefrom for purposes of controlling the temperature in the circulating fluidized bed. The raw product gas after being processed in the mechanical separator device is fed to a gas cooler which operates to produce process steam. The raw product gas is then further cleansed of fine dust by being made to pass through a filter device, such as an electrostatic precipitator, a baghouse, or some other similar type of filtering equipment. Thereafter, the raw product gas is further cleansed in the course of passing through a scrubber wherein $H_2S$ is removed therefrom prior to the resulting, now cleansed, product gas being employed as a fuel gas in any one or more of a variety of different types of applications such as, for example, for steam generation purposes in a gas-fired boiler, for incineration purposes in a bark boiler or lime kiln, etc. If so desired, the fine dust filter may be eliminated and the aforementioned scrubber designed through the association therewith of a venturi, etc., to perform double duty, i.e., both particulate removal and $H_2S$ removal.

BRIEF DESCRIPTION OF THE DRAWINGS

FIG. 3 is an enumeration of the major chemical reactions for Kraft liquor preparation when a black liquor gasification system and process therefor constructed in accordance with the present invention is employed.

DESCRIPTION OF THE PREFERRED EMBODIMENT

Figure 1:
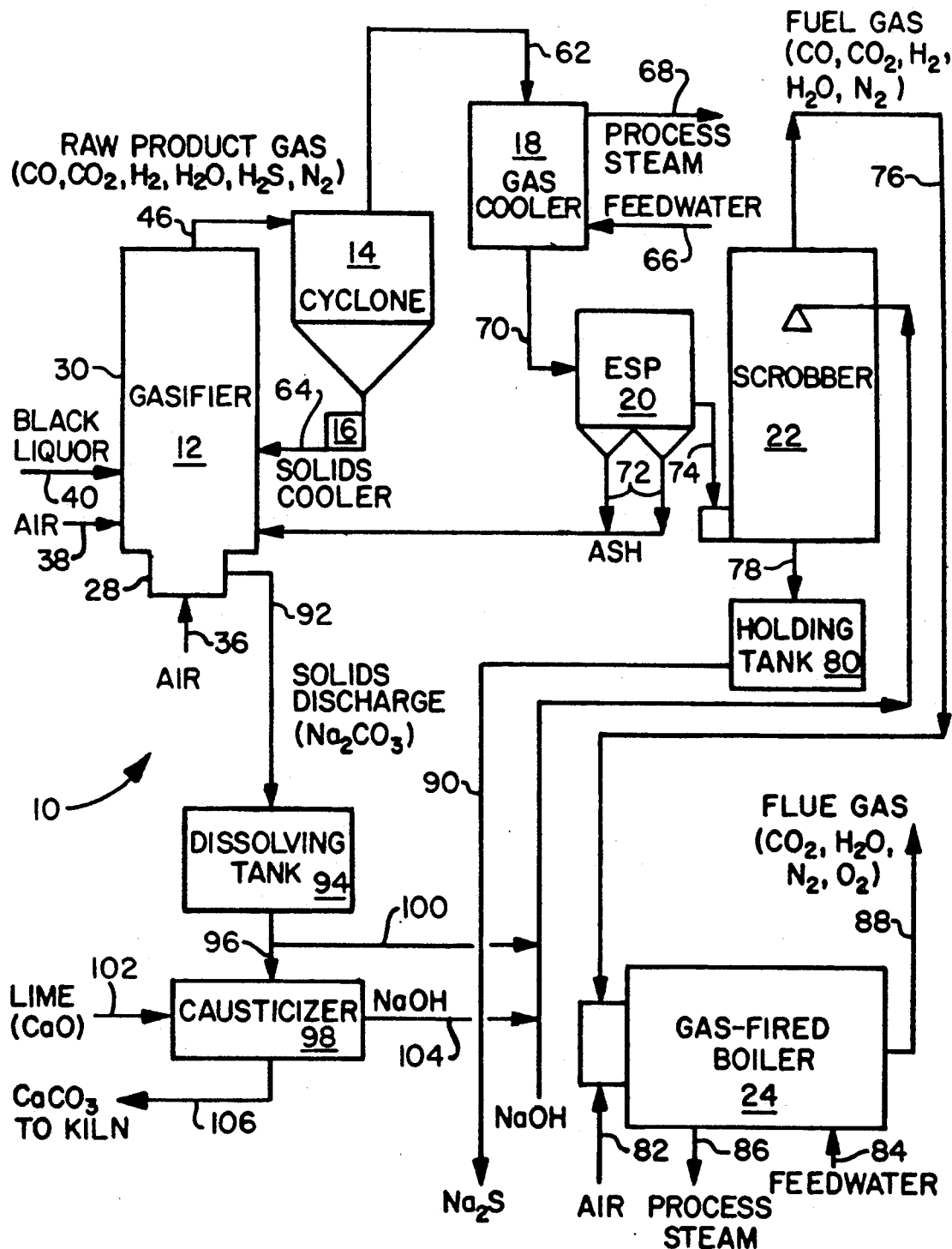
FIG. 1 is a process flow diagram of a black liquor gasification system and process therefor constructed in accordance with the present invention.

Referring now to the drawing, and more particularly to FIG. 1 thereof, there is depicted therein a process flow diagram for a black liquor gasification system, generally designated therein by the reference numeral 10, constructed in accordance with the present invention. As depicted in FIG. 1, the major components of the black liquor gasification system 10 are the gasifier means, generally designated by the reference numeral 12, the mechanical separation means, generally designated by the reference numeral 14, the solids cooler means, generally designated by the reference numeral 16, the gas cooler means, generally designated by the reference numeral 18, the fine dust filter means, generally designated by the reference numeral 20, the $H_2S$ removal means, generally designated by the reference numeral 22, and the gas-fired boiler means, generally designated by the reference numeral 24.

Each of the above-enumerated components of the black liquor gasification system 10 will now be discussed in detail commencing with a description of the gasifier means 12. In accord with the preferred embodiment of the invention, the gasifier means 12 comprises a circulating fluidized bed, the latter being denoted generally in FIG. 2 of the drawing by the reference numeral 26. The nature of the construction and the mode of operation of the circulating fluidized bed 26 are best understood with reference to FIG. 2 of the drawing. The circulating fluidized bed 26 for a purpose to be described hereinafter embodies both a lower portion, denoted by the reference numeral 28, and an upper portion, denoted by the reference numeral 30. Cooperatively associated with the circulating fluidized bed 26, in accord with the illustrated embodiment thereof in FIG. 2 of the drawing, are mechanical separation means 14 that in turn are connected in fluid flow circuit relation by means of solids recycle means denoted in FIG. 2 by the reference numeral 32 to seal pots/heat exchanger means, denoted in FIG. 2 by reference numeral 34, and therethrough to the circulating fluid bed 26.

Figure 2:
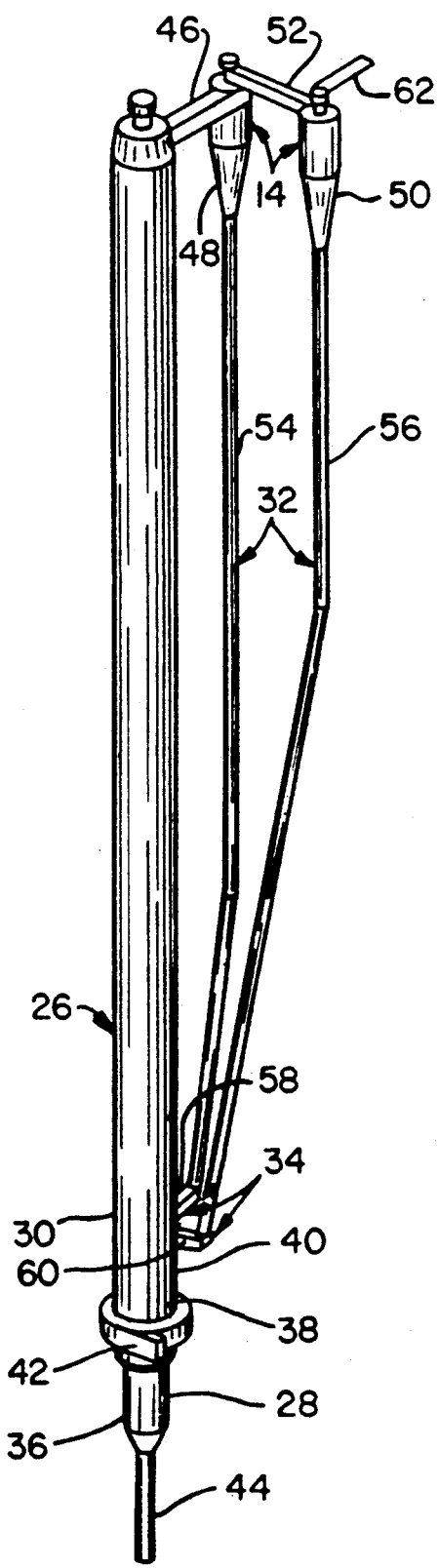
FIG. 2 is an isometric view of the gasifier and mechanical separation portion of the black liquor gasification system and process therefor of FIG. 1 constructed in accordance with the present invention.

Continuing with reference to FIG. 2 of the drawing, but turning next to a consideration of the mode of operation of the circulating fluidized bed 26, fluidizing air, as shown at 36 in FIG. 2 of the drawing, is fed to the lower portion 28 of the circulating fluidized bed 26. The fluidizing air 36, in a manner well-known to those skilled in the circulating fluidized bed industry, is employed for purposes of maintaining the solids in suspension within the circulating fluidized bed 26. Above the point 36 whereat the fluidizing air is fed into the lower portion 28 of the circulating fluidized bed 26, reaction air and black liquor, shown at 38 and 40, respectively, in FIG. 2 are fed into the upper portion 30 of the circulating fluidized bed 26. In accord with the illustrated embodiment thereof in FIG. 2 of the drawing, provision has been made, as seen at 42 in FIG. 2, for gas recirculation to be employed, if required, with the circulating fluidized bed 26. Gas recirculation 42 may be found to be required during low load or variable pressure operation of the circulating fluidized bed 26.

With further regard to the mode of operation of the circulating fluidized bed 26 depicted in FIG. 2 of the drawing, the chemicals which are recovered in the circulating fluidized bed 26 are drained from the lower portion 28 thereof, preferably by gravity, through the drain means denoted by the reference numeral 42 in FIG. 2. The raw product gas that is generated as a result of the burning within the circulating fluidized bed 26 of the combustibles, which the black liquor contains, leaves along with the solids entrained therewith from the upper portion 30 of the circulating fluidized bed 26 through the outlet therefrom, which is denoted in FIG. 2 by the reference numeral 46. Upon leaving the outlet 46 of the circulating fluidized bed 26, the raw product gas and solids are fed to the mechanical separation means 14.

In accord with the illustrated embodiment of the invention, the mechanical separation means 14 comprises a pair of cyclones, denoted by the reference numerals 48 and 50 in FIG. 2. As best seen with reference to FIG. 2, the cyclones 48 and 50, as shown at 52, are interconnected one to another in fluid flow relation. The cyclones 48 and 50 are operative to remove the solids from the raw product gas that is fed thereto. The solids, which after being removed from the raw product gas are collected in the cyclones 48 and 50, are fed, preferably by gravity, via the solids recycle means 32 to the seal pots/heat exchanger means 34.

As best understood with reference to FIG. 2 of the drawing, the solids recycle means 32 in accord with the illustrated embodiment thereof comprises a pair of droplegs, denoted in FIG. 2 by the reference numerals 54 and 56. However, it is to be understood that if deemed sufficient for purposes of any given application a lesser or greater number of cyclones and seal pot/heat exchangers may be employed without departing from the essence of the present invention. Each of the droplegs 54 and 56 has one end thereof connected in fluid flow relation to one of the cyclones 48 and 50 and the other end thereof connected in fluid flow relation to the seal pots/heat exchanger means 34, which in accord with the illustrated embodiment thereof comprises a pair of seal pots and heat removal surfaces, with each one of the pair of seal pots and heat removal surfaces being denoted for ease of reference in FIG. 2 by the reference numerals 58 and 60, respectively. To thus summarize, the dropleg 54 has one end thereof connected in fluid flow relation to the cyclone 48 and the other end thereof connected in fluid flow relation to the seal pot and/or heat removal surface 58, whereas the dropleg 56 has one end thereof connected in fluid flow relation to the cyclone 50 and the other end connected in fluid flow relation to the seal pot and/or heat removal surface 60. The heat removal surface 58 is used to maintain temperature control of the circulating fluidized bed 26 by extracting additional heat from the circulating solids. There may be instances, however, wherein it may be possible without departing from the essence of the present invention to bypass solids around the heat removal surface 58 to control the bulk solids temperature.

From the seal pot and/or heat removal surface 58 and 60, respectively, the solids, which had been removed from the raw product gas and collected in the cyclones 48 and 50, are fed to the upper portion 30 of the circulating fluidized bed 26. On the other hand, the raw product gas from which the solids have been removed, and otherwise referred to as low calorific gas leaves the cyclones 48 and 50 through the outlet therefrom denoted by the reference numeral 62 in FIG. 2 of the drawing. This low calorific gas may be employed for clean-up purposes or some other use may be made thereof at the site whereat the black liquor gasification system 10 is being utilized.

In accord with the preferred embodiment of the black liquor gasification system 10, which comprises the subject matter of the present invention, the circulating fluidized bed 16 and the cyclones 48 and 50 are of steel construction with the use of some refractories in erosive and corrosive areas. The height of the circulating fluidized bed 26 itself is based on the residence time needed to effectuate within the circulating fluidized bed 26 the required chemical reaction of the black liquor fed thereto at 40 in FIG. 2.

A description will now be had of the process that takes place during the operation of the black liquor gasification system 10 constructed in accordance with the present invention. For purposes of this description, reference will be had in particular to the simplified process flow schematic that is depicted in FIG. 1 of the drawing. As depicted therein, fluidizing air is fed into the lower portion 28 of the gasifier means 12, i.e., the circulating fluidized bed 26, at 36. In addition, reaction air and black liquor are fed into the upper portion 30 of the gasifier means 12 at 38 and 40, respectively. As a consequence of the reactions that take place within the gasifier means 12 a raw product gas composed of CO, $CO_2$, $H_2$, $H_2O$, $H_2S$ and $N_2$ is produced therein. This raw product gas leaves the upper portion 30 of the gasifier means 12 at 46. From the gasifier means 12, the raw product gas is fed to the mechanical separation means 14, i.e., the cyclones 48 and 50. Within the mechanical separation means 14, the solids entrained with the raw product gas are separated therefrom with the raw product gas now minus the solids exiting from the mechanical separator means 14 at 62 and with the solids leaving the mechanical separation means 14 being recycled to the upper portion 30 of the gasifier means 12 by means of the solids recycle means 32. In the course of being recycled from the mechanical separation means 14 to the gasifier means 12 the solids may be made to pass through the solids cooler means 16, i.e., the pair of seal pots and heat transfer surfaces 58 and 60, respectively, for purposes of removing excess heat from the solids to control the temperature within the gasifier means 12. For purposes of ease of reference, the point at which the solids after having passed through the solids cooler means 16 enter the gasifier means 12 is denoted at 64 in FIG. 1 of the drawing.

Continuing with the description of the simplified process flow schematic, which is depicted in FIG. 1 of the drawing, the raw product gas from which the solids have been removed in the mechanical separation means 14 upon exiting at 62 from the mechanical separation means 14 is fed to the gas cooler means 18 wherein the raw product gas is utilized to produce steam. To this end, as depicted in FIG. 1, feedwater enters the gas cooler means 18 at 66 and is converted therein through the heat from the raw product gas to process steam which leaves the gas cooler means 18 at 68. After passing through the gas cooler means 18, the raw product gas exits therefrom at 70 and is fed to the dust filter means 20.

In accord with the preferred embodiment of the invention, the dust filter means 20 preferably comprises an electrostatic precipitator, which in known fashion is operative to cleanse the raw product gas entering the dust filter means 20 of the fine dust entrained therewith. However, some other conventional form of dust filter means such as a baghouse, etc. could equally well be utilized, without departing from the essence of the present invention, for purposes of cleansing the raw product gas of the fine dust entrained therewith. The fine dust that is collected in the dust filter means 20, as depicted at 72 in FIG. 1 of the drawing, is fed back to the upper portion 30 of the circulating fluidized bed 26. On the other hand, the raw product gas, which has now been cleansed of fine dust, leaves the dust filter means 20, as shown at 74 in FIG. 1 of the drawing, and is fed to the $H_2S$ removal means 22.

The $H_2S$ removal means 22, in accord with the preferred embodiment of the present invention, preferably comprises a scrubber, which in known fashion is operative to cleanse the raw product gas of $H_2S$ as the raw product gas passes through the scrubber, i.e., the $H_2S$ removal means 22. After being cleansed of $H_2S$ in the $H_2S$ removal means 22 the raw product gas now being composed of CO, $CO_2$, $H_2$, $H_2O$ and $N_2$ exits from the $H_2S$ removal means 22, as seen at 76 in FIG. 1 of the drawing, and in accord with the illustrated embodiment of the present invention is fed to the gas-fired boiler means 24 for use therein as fuel gas. On the other hand, the $H_2S$ that is removed from the raw product gas in the $H_2S$ removal means 22, i.e., scrubber, exits therefrom, as shown at 78 in FIG. 1, and is fed to a holding tank, denoted generally by the reference numeral 80 in FIG. 1 of the drawing, for a purpose to which reference will be made hereinafter. As mentioned herein previously, without departing from the essence of the present invention the fine dust filter means 20, if so desired, may be eliminated and the $H_2S$ removal means 22, i.e., scrubber, designed through the association therewith of a venturi, etc., to perform double duty, i.e., both particulate removal and $H_2S$ removal.

For purposes of completing the discussion of the simplified process flow schematic, which is depicted in FIG. 1 of the drawing, reference is once again had thereto. As best understood with reference to FIG. 1, in addition to the fuel gas, which exits from the $H_2S$ removal means 22 at 76 and is fed to the gas-fired boiler means 24, air, shown at 82 in FIG. 1, is also fed to the gas-fired boiler means 24. The air 82 is intended to be utilized within the gas-fired boiler means 24 to support therein the combustion of the fuel gas 76. In addition to the aforementioned combustion air 82 and fuel gas 76, feedwater, shown at 84 in FIG. 1, is also supplied to the gas-fired boiler means 24. Combustion of the fuel gas 76 in the gas-fired boiler means 24 is operative in well-known fashion to convert the feedwater 84 to process steam, which leaves the gas-fired boiler means 24 at 86. This process steam 86 is suitable for use elsewhere in the paper-making facility with which the black liquor gasification system 10 of the present invention is cooperatively associated. After the combustion thereof in the gas-fired boiler means 24 the fuel gas 76 leaves the gas-fired boiler means 24, as shown at 88, as flue gas, the latter being composed of $CO_2$, $H_2O$, $N_2$ and $O_2$. However, a lime kiln, gas turbine and other means of gas incineration and process integration may equally well be substituted for the gas-fired boiler means 24 without departing from the essence of the present invention.

The other aspects of the simplified process flow schematic depicted in FIG. 1 of the drawing that have yet to be discussed relate to the discharge from the holding tank 80 and the discharge from the circulating fluidized bed 26, respectively. Considering first the discharge from the holding tank 80, the discharge therefrom, which is denoted by the reference numeral 90 in FIG. 1 of the drawing, is in the form of $Na_2S$. Insofar as the discharge from the circulating fluidized bed 26 is concerned, this discharge, denoted by the reference numeral 92 in FIG. 1 of the drawing, is a solids discharge consisting primarily of $Na_2CO_3$. From the circulating fluidized bed 26, the solids discharge 92 is, in accord with the illustrated embodiment of the black liquor gasification system 10 of the present invention, fed to a dissolving tank, denoted generally by the reference numeral 94 in FIG. 1 of the drawing. With further reference to FIG. 1, as seen therein a first portion, shown at 96, of the discharge from the dissolving tank 94 is fed to a causticizer, denoted generally by the reference numeral 98, and a second portion, primarily $Na_2CO_3 + Na_2S$, shown at 100, of the discharge from the dissolving tank 94 is fed to the $H_2S$ removal means 22 for use therein in connection with the removal of $H_2S$ from the raw product gas fed thereto as shown at 74 in FIG. 1. The $NAHCO_3$ and NAHS removed from the $H_2S$ removal means 22 is fed from the exit 78 thereof to the holding tank 80 to be reacted with CaO from a kiln (not shown) to produce $Na_2S + CACO_3$ which can be used in the Kraft cycle. A second $H_2S$ scrubbing option is that within the causticizer 98, the discharge 96 from the dissolving tank 94 is converted into NAOH and CACO$_3$. To this end, lime, i.e., CaO is fed, as shown at 102, to the causticizer 98. The NAOH upon leaving the causticizer 98 at 104 is fed back to the H$_2$S removal means 22 for use therein in connection with the removal of H$_2$S from the raw product gas that is fed, as shown at 74 in FIG. 1, to the H$_2$S removal means 22. The CACO$_3$ upon leaving the causticizer 98 at 106 is preferably fed to the kiln (not shown) for utilization therein.

The major chemical reactions that need to occur for Kraft liquor preparation when employing the black liquor gasification system 10 of the present invention are shown in FIG. 3 of the drawing. Thus, as best understood with reference to FIG. 3, the overall reaction, from a generalized standpoint, which occurs within the recovery unit, i.e., the circulating fluidized bed 26, is that defined by the equation, which is denoted generally by the reference numeral 108 in FIG. 3. In accordance therewith, black liquor plus air are caused to react within the circulating fluidized bed 26 such as to form NACO$_3$+CO+CO$_2$+H$_2$+H$_2$O+H$_2$S+N$_2$. As described hereinbefore in connection with the discussion of the simplified process flow schematic depicted in FIG. 1 of the drawing, the aforementioned H$_2$S is removed from the raw product gas in the H$_2$S removal means 22, which as stated previously preferably comprises a scrubber. The aforementioned Na$_2$CO$_3$ may either be fed directly to the scrubber 22 as depicted in FIG. 3, or alternatively, also as depicted in FIG. 3, the aforementioned Na$_2$CO$_3$ may be made to first pass through a dissolving tank 94 and a causticizer 98 whereby the Na$_2$CO$_3$+Na$_2$S is directly fed to the H$_2$S removal means 22 or, as has been described hereinbefore previously in connection with the discussion of the simplified process flow schematic which is depicted in FIG. 1 of the drawing, is converted to NAOH before being supplied to the scrubber 22. Both Na$_2$CO$_3$ (aqueous) and NAOH are suitable for use in effecting the H$_2$S scrubbing function.

A second reaction associated with the recovery unit, i.e., the circulating fluidized bed 26, is that denoted generally by the reference numeral 110 in FIG. 3 relating to sulfate reduction. In accordance therewith, Na$_2$SO$_4$+4CO react to form Na$_2$S+4CO$_2$. Thereafter, this Na$_2$S+H$_2$O+CO$_2$ react to form Na$_2$CO$_3$+H$_2$S. As discussed above with respect to the reaction denoted by the reference numeral 108, the Na$_2$CO$_3$ may either be fed to the scrubber 22 directly, or may be first converted to NAOH as a consequence of being made to pass through the dissolving tank 94 and the causticizer 98 with the NAOH then in turn being fed to the scrubber 22.

Continuing with the discussion of the reactions that are shown in FIG. 3 of the drawing, the reaction which occurs within the causticizer 98 is depicted in FIG. 3 wherein this reaction is denoted generally by the reference numeral 112. Thus, as best understood with reference to FIG. 3, Na$_2$CO$_3$+CaO+H$_2$O react within the causticizer 98 to form 2NaOH+CaCO$_3$. The 2NaOH then in turn is fed to the scrubber 22 wherein the 2NaOH is made to react in a manner yet to be described. The CaCO$_3$, on the other hand, is fed to a kiln wherein CaO is formed from the CACO$_3$. It is this CaO, preferably, which then is fed from the kiln to the causticizer 98 for use in the reaction denoted by the reference numeral 112 in FIG. 3.

As depicted in FIG. 3, alternatively there may be fed to the scrubber 22 either 2NaOH or Na$_2$CO$_3$. In the case wherein 2NaOH is fed to the scrubber 22 the reaction that occurs therein is that which is denoted generally by the reference numeral 114. Namely, the 2NaOH+H$_2$S react to form Na$_2$S+2H$_2$O. Then, this Na$_2$S+NAOH react to form white liquor for subsequent usage in the Kraft cycle. In the case wherein it is Na$_2$CO$_3$ which is fed to the scrubber 22 there are a pair of reactions that take place; namely, that denoted generally by the reference numeral 116 in FIG. 3, and that denoted generally by the reference numeral 118 in FIG. 3. With respect to the reaction denoted by the reference numeral 116, the Na$_2$CO$_3$+H$_2$S+H$_2$O react to form NaHCO$_3$+NaHS. This NAHCO$_3$ and NAHS are then caused to react with CaO in the reaction denoted by the reference numeral 118 to form Na$_2$S+CACO$_3$+H$_2$O.

There are a number of aspects of the black liquor gasification system 10 of the present invention that are deemed to be particularly worthy of note. For example, it is deemed to be significant to point out that the gasification of the black liquor that takes place in the gasifier 26, i.e., the circulating fluidized bed 26, occurs at a temperature of greater than 700° C. at some location in the upper portion 30 of the circulating fluidized bed 26 at substantially atmospheric pressure. Operating at this temperature is sufficient to preclude the formation of a smelt.

A second point to be noted is that the circulating fluidized bed 26 is designed to have a smaller cross-sectional area at the bottom, i.e., lower portion 28, and a larger cross-sectional area at the level, i.e., upper portion 30, where the black liquor 40 and the reaction, i.e., additional, air 38 is fed to the circulating fluidized bed 26. The dimensions of these areas are established based on fluidizing axial velocities in a range of 1 to 8 meters/second depending on the pressure at which the circulating fluidized bed 26 is being operated, the desired bed ash agitation and black liquor characteristics. As such, the cross-sectional area of the lower portion 28 of the circulating fluidized bed 26 is approximately one-half to two-thirds of that of the cross-sectional area of the upper portion 30 of the circulating fluidized bed 26. To this end, the velocities achieved within the circulating fluidized bed 26 by virtue of this construction are deemed to be sufficient to achieve the necessary mixing within the circulating fluidized bed 26 of the black liquor 40 and the reaction air 38 such that there is no increase in the formation of carbon when employing the black liquor gasification system 10 of the present invention from that which occurs when employing a Chemical Recovery Unit of conventional construction.

A third point of significance is that the black liquor 40 is fed primarily into the lowermost portion of the large cross-sectional area 30 of the circulating fluidized bed 26. However, if deemed desirable, a second level of black liquor nozzles can be located, without departing from the essence of the present invention, in the tapered section between the upper portion 30 and the lower portion 28 of the circulating fluidized bed 26, depending on the mixing characteristics and the required number of feed points. In such an event, it is to be understood that reaction air would also be fed into the circulating fluidized bed 26 in the same vicinity as where the black liquor feed points are located.

A fourth point worthy of note is that air is introduced into the circulating fluidized bed 26 at two levels; namely, fluidizing air is introduced at 36 as shown in FIG. 2 while reaction air is introduced at 38 as shown in FIG. 2. The fluidizing air 36 is fed through a series of nozzles, commonly called a distributor, located in the lower portion 28 of the circulating fluidized bed 26. The function of the fluidizing air 36 is to fluidize the solids and to provide sufficient air for carbon gasification of the solids leaving the circulating fluidized bed 26 through the drain denoted at 44 in FIG. 2. The function of the reaction air 38 is to control the overall stoichiometry and gas higher heating value within the circulating fluidized bed 26 as well as to help control the temperature within the circulating fluidized bed 26.

A fifth point of note is that control of the temperature within the circulating fluidized bed 26 can also be regulated through the use of a solids cooler means, such as that depicted at 16 in FIG. 1. As best understood with reference to FIG. 1, such a solids cooler means 16 is located between the outlet of the mechanical separation means 14, i.e., cyclone 14, and the entrance, depicted at 64 in FIG. 1, to the circulating fluidized bed 26. In the event such a solids cooler means 16 is to be utilized for purposes of regulating temperature control in the circulating fluidized bed 26, the solids cooler means 16 preferably would comprise a bubbling bed type ash cooler capable of being operated to cool the solids that are being returned to the circulating fluidized bed 26 from the mechanical separation means 14. The dissipated heat recovered during such cooling in turn can be employed, as desired, in either the gas, air or steam cycle associated with the use of the black liquor gasification system 10 in a paper-making facility.

A sixth point to be noted is that another means of controlling the temperature within the circulating fluidized bed 26 is to keep a constant ratio of the black liquor organics flow rate to the reaction air flow rate. If the temperature within the circulating fluidized bed 26 drops, more reaction air is fed to the circulating fluidized bed 26 if the temperature anywhere therein has not exceeded a nominal value such as 750° C. On the other hand, if the temperature within the circulating fluidized bed 26 rises, the amount of reaction air feed is conversely diminished. During normal operation of the circulating fluidized bed 26, the reaction air to dry solids ratio should be in the range of 35 to 85% stoichiometry to ensure full oxidation of all organics.

A seventh point worthy of note is that in the event the black liquor feed to the circulating fluidized bed 26 is lost, then the air flow to the circulating fluidized bed 26 should be shut off and the circulating fluidized bed 26 purged with an inert, cool medium.

An eighth point to be noted is that the dust removed in the mechanical separation means 14 is fully recycled back to the circulating fluidized bed 26 using the seal pots/heat exchanger means denoted by the reference numeral 34 in FIG. 2. On the other hand, the dust exiting from the mechanical separation means 14 is removed through the use of the fine dust filter means depicted at 20 in FIG. 1, and is recycled as shown at 72 in FIG. 1 back to the circulating fluidized bed 26, directly below the black liquor feed 40, to enhance carbon conversion and salt reactions. In addition, the recycled ash can also be mixed with the black liquor upon reentry to the circulating fluidized bed 26 so that the fine solids can adhere to the bed material to enhance reactions. Likewise, the fine solids can also be directly injected into the solids cooler means depicted at 16 in FIG. 1 to preheat and provide early ignition of the carbon in the ash.

A ninth point of note is that the circulating fluidized bed 26 will be started with a high temperature melting point material, such as $CACO_3$ to avoid local melting and agglomeration during start-up. The black liquor 40 is then introduced when the temperature is above some ignition temperature such as 450° C.

A tenth point is that in accord with the mode of operation of the black liquor gasification system of the present invention, the sulfates to a greater than 90% extent will be reduced to sulfides. To this end, the ratio between $H_2S$ and $Na_2S$ can be controlled by increasing either the pressure or the temperature within the circulating fluidized bed 26. For example, by increasing the pressure in the circulating fluidized bed 26 from 1 bar to 4 bar, the amount of sulfur in the gas versus the amount of sulfur remaining in the ash will increase from about 35% of the total sulfur as $H_2S$ in the gas to about 75% as $H_2S$ in the gas. On the other hand, increasing the temperature within the circulating fluidized bed 26 will result in less sulfur in the form of $H_2S$ in the gas. In this way, it is possible to control the sulfide split.

Another point to be noted is that by adding metal oxides such as $TiO_2$ to the black liquor 40 that is fed to the circulating fluidized bed 26, the amount of sulfur in the gas in the form of $H_2S$ can be increased to 100%. At the same time, sodium carbonate ($Na_2CO_3$) is converted to $Na_2O\cdot3TiO_2$, which can be dissolved in water to form sodium hydroxide (NAOH) directly, if the reaction temperatures within the circulating fluidized bed 26 are above 700° C. In this connection, reference may be had to the term "autocausticizing" which means direct conversion of sodium carbonate to sodium hydroxide through the reaction with the metal oxide then followed by dissolution in water to recover the NAOH and metal oxide. The NAOH generated as a consequence thereof may be integrated into the Kraft cycle or used in the $H_2S$ removal means depicted at 22 in FIG. 1 as a scrubber medium for $H_2S$ removal.

Still another point worthy of mention is that by using a very short residence time for the produced gas in the $H_2S$ removal means depicted at 22 in FIG. 1, and by utilizing the sodium carbonate and sodium sulfide from the solids drain, depicted at 92 in FIG. 1, of the circulating fluidized bed 26 dissolved in water, the $H_2S$ in the gas can be removed to an extent greater than 90%. In this regard, the water and dissolved solids in the $H_2S$ removal means depicted at 22 in FIG. 1 must be kept at a pH of about 10. Furthermore, the scrubbing of the $H_2S$ can also be performed by using the sodium hydroxide from either the causticizer depicted at 98 in FIG. 1 or from some other source to form eventually white liquor, which is one of the steps in the Kraft cycle. Finally, in lieu of a wet scrubber system for the removal of $H_2S$ from the low calorific gas, a hot, dry system such as a zinc ferrite or ferric oxide solids may be utilized. In accord therewith, $H_2S$ will be removed as elemental sulfur at high temperature, e.g., 700° F., which allows for the utilization thereof in the future for higher efficiency, combined cycle gas turbine plants. At the same time the elemental sulfur that is produced in connection therewith can be sold as a by-product or else it may be reintroduced into the Kraft process.

Yet another point is that the low calorific gas, which is produced in the circulating fluidized bed 26, can be integrated into the paper-making facility to provide fuel gas, for example, for the kilns, boilers, gas turbines, or may be utilized in some other application.

Yet still another point worthy of note with respect to the black liquor gasification system 10 of the present invention is that the circulating fluidized bed 26 may be designed as a non-refractory lined, non-cooled high grade alloy or stainless steel vessel. In such a case, the vessel would be insulated with insulation externally. Such a design is deemed to be less costly, simpler to design, and easier to fabricate and maintain.

Thus, in accordance with the present invention there has been provided a new and improved system for use as a replacement for a Tomlinson cycle, Chemical Recovery Unit. Moreover, there has been provided in accord with the present invention such a new and improved system for use as a replacement for a Tomlinson cycle, Chemical Recovery Unit which is characterized in that in the operation thereof no smelt is formed. Also, in accordance with the present invention there has been provided such a new and improved system for use as a replacement for a Tomlinson cycle, Chemical Recovery Unit which is characterized in that in the operation thereof there is no increased formation of carbon. Further, there has been provided in accord with the present invention such a new and improved system for use as a replacement for a Tomlinson cycle, Chemical Recovery Unit which is characterized in that dry recoverable salts that are capable of being utilized in the paper-making process are produced therewith. In addition, in accordance with the present invention there has been provided such a new and improved system for use as a replacement for a Tomlinson cycle, Chemical Recovery Unit which is characterized in that it is inherently safer than the systems which have been utilized heretofore for similar purposes. Penultimately, there has been provided in accord with the present invention such a new and improved system for use as a replacement for a Tomlinson cycle, Chemical Recovery Unit which is characterized in that it is more cost effective than the systems which have been utilized heretofore for similar purposes. Finally, in accordance with the present invention there has been provided such a new and improved system for use as a replacement for a Tomlinson cycle, Chemical Recovery Unit which is characterized in that it is at least no more difficult to operate than the systems which have been utilized heretofore for similar purposes.

While one embodiment of our invention has been shown, it will be appreciated that modifications thereof, some of which have been alluded to hereinabove, may still be readily made thereto by those skilled in the art. We, therefore, intend by the appended claims to cover the modifications alluded to herein as well as all the other modifications which fall within the true spirit and scope of our invention.

What is claimed is:

1. A black liquor gasification process, utilizing a circulating fluidized bed having a first portion and a second portion to produce from the combustion of black liquor dry recoverable salts and a low calorific gas, comprising the steps of:

a. injecting into the first portion of the circulating fluidized bed as the sole source of circulating solids therewithin black liquor containing both solids and fluids;
  b. injecting into the second portion of the circulating fluidized bed in the form of fluidizing air a first supply of air sufficient in quantity to effect the fluidizing therewith of the solids contained in the black liquor as well as to effect the carbon gasification of the solids contained in the black liquor;
  c. injecting into the first portion of the circulating fluidized bed in the form of reaction air a second supply of air sufficient both in quantity to establish a reducing atmosphere in the first portion of the circulating fluidized bed suitable for generating a low calorific gas therewithin and to enable control of the temperature within the first portion of the circulating fluidized bed to be effected with the reaction air;
  d. recovering within the circulating fluidized bed chemicals from the black liquor;
  e. discharging as dry solids from the second portion f the circulating fluidized bed the chemicals recovered within the circulating fluidized bed from the black liquor;
  f. combusting within the circulating refluidized bed the organic compounds of the black liquor to generate as a consequence of such combustion thereof a low calorific gas containing $H_2S$ and having coarse solids and fine dust entrained therein;
  g. discharging from the first portion of the circulating fluidized bed to a single mechanical separation device the low calorific gas containing $H_2S$ and having coarse solids and fine dust entrained therein;
  h. removing the coarse solids from the low calorific gas containing $H_2S$ and having coarse solids and fine dust entrained therein during the passage through the single mechanical separation device of the low calorific gas containing $H_2S$ and having coarse solids and the fine dust entrained therein;
  i. discharging the coarse solids from the single mechanical separation device and recycling these coarse solids from the single mechanical separation device to the first portion of the circulating device to the first portion of the circulating fluidized bed;
  j. discharging the low calorific gas containing $H_2S$ and having fine dust entrained therein but now minus coarse solids from the single mechanical separation device to a filter device;
  k. removing the fine dust from the low calorific gas containing $H_2S$ and having fine dust entrained therein during the passage through the filter device of the low calorific gas containing $H_2S$ and having fine dust entrained therein;
  l. discharging the fine dust from the filter device and recycling this fine dust from the filter device to the first portion of the circulating fluidized bed;
  m. discharging the low calorific gas containing $H_2S$ but now minus fine dust from the filter device to a $H_2S$ removal device;
  n. removing the $H_2S$ from the low calorific gas containing $H_2S$ during the passage through the $H_2S$ removal device of the low calorific gas containing $H_2S$;
  o. discharging the $H_2S$ from the $H_2S$ removal device; and
  p. discharging the low calorific gas now minus $H_2S$ from the $H_2S$ removal device to a gas-fired device for burning therewithin.

2. The black liquor gasification process as set forth in claim 1 further comprising the step of reacting the black liquor and reaction air in the circulating fluidized bed to form $Na_2CO_3 + CO + CO_2 + H_2 + H_2O + H_2S + N_2$.

3. The black liquor gasification process as set forth in claim 2 further comprising the step of reacting the $Na_2CO_3$ formed in the step of claim 2 with $4CO_2$ in the circulating fluidized bed to form $Na_2S + 4CO_2$ and thereafter reacting the $Na_2S$ so formed with $H_2O$ and $CO_2$ in the circulating fluidized bed to form $Na_2CO_3 + H_2S$.

4. The black liquor gasification process as set forth in claim 1 further comprising the step of discharging the chemicals recovered from the black liquor in the circulating fluidized bed from the circulating fluidized bed to a causticizer.

5. The black liquor gasification process as set forth in claim 4 further comprising the step of reacting the $Na_2CO_3$ formed in the step of claim 2 with CaO and $H_2O$ in the causticizer to form $2NaOH + CaCO_3$.

6. The black liquor gasification process as set forth in claim 4 further comprising the steps of:

a. discharging the 2NaOH formed in the step of claim 5 from the causticizer to the $H_2S$ removal device; and b. reacting the 2NaOH in the $H_2S$ removal device to form $Na_2S + 2H_2O$ and thereafter reacting the $Na_2S$ so formed with NaOH to form white liquor.

7. The black liquor gasification process as set forth in claim 1 further comprising the step of reacting the $Na_2CO_3$ formed in the step of claim 2 with $H_2S$ and $H_2O$ in the $H_2S$ removal device to form $NaHCO_3 + NaHS$ and thereafter reacting the $NaHCO_3$ and NaHS so formed with CaO to form $Na_2S + CaCO_3 + H_2O$.

8. The black liquor gasification process as set forth in claim 1 further comprising the step of operating the circulating fluidized bed at a pressure of 1 to 4 bar.

* * * * *